US012755869B2

(12) United States Patent
Li et al.

(10) Patent No.: US 12,755,869 B2
(45) Date of Patent: Oct. 6, 2026

(54) FLEXIBLE HIGH-TEMPERATURE SUPERCONDUCTOR AND METHOD FOR ITS PRODUCTION

(71) Applicant: S-Innovations LLC, Moscow (RU)

(72) Inventors: Sergei R. Li, Moscow (RU); Anton V. Markelov, Moscow (RU); Alexandre A. Molodyk, Moscow (RU); Valerii V. Petrykin, Moscow (RU); Sergei V. Samoilenkov, Moscow (RU)

(73) Assignee: S-INNOVATIONS LLC, Moscow (RU)

( * ) Notice: Subject to any disclaimer, the term of this patent is extended or adjusted under 35 U.S.C. 154(b) by 1217 days.

(21) Appl. No.: 17/683,850

(22) Filed: Mar. 1, 2022

(65) Prior Publication Data

US 2023/0034446 A1 Feb. 2, 2023

(30) Foreign Application Priority Data

Jul. 21, 2021 (RU) ........................... RU2021121616

(51) Int. Cl.
*H01B 12/02* (2006.01)
*H01F 1/032* (2006.01)

(52) U.S. Cl.
CPC ............. *H01B 12/02* (2013.01); *H01F 1/032* (2013.01)

(58) Field of Classification Search
CPC ...................................................... H01B 12/02
See application file for complete search history.

(56) References Cited

U.S. PATENT DOCUMENTS 8,034,745 B2 10/2011 Goyal
2006/0025310 A1 2/2006 Driscoll et al.

(Continued)

FOREIGN PATENT DOCUMENTS

RU 2091880 C1 4/1994
RU 2010782 C1 9/1997
WO 2020117369 A2 6/2020

OTHER PUBLICATIONS

Hahn, S. et al. 45.5-tesla direct-current magnetic field generated with a high-temperature superconducting magnet. Nature 570, 496-499 (2019).

(Continued)

*Primary Examiner* — Paul A Wartalowicz
(74) *Attorney, Agent, or Firm* — Patentbar International

(57) ABSTRACT

The invention relates to electrical engineering, in particular, to the manufacturing technology of flexible high-temperature superconductors (HTS) with high critical current density in external magnetic field and to the method of manufacturing of said superconductors (tapes). The invention is applicable to industrial manufacturing of HTS wires with very high values of critical current density in magnetic fields over 1 Tesla at temperatures below 50 Kelvin, in particular, to industrial manufacturing of HTS wires intended for application in compact fusion reactors. Flexible high temperature superconductor is comprised of a substrate and a superconductor layer with $RE_{1+2x}Ba_2Cu_3O_{7+3x}$ overall composition comprised of a superconductor matrix of $REBa_2Cu_3O_7$ composition and non-superconducting nanoparticles of $RE_2O_3$ composition, where x=0.05-0.15, RE is a rare earth element from the Y, Dy, Ho, Er, Tm, Yb and Lu group, whereas the concentration density of the said nanoparticles is at least $10^{16}$ nanoparticles/cm$^3$. Method of manufacturing of the superconductor is comprised of pulsed laser deposition of superconductor material with $RE_{1+2x}Ba_2Cu_3O_{7+3x}$ overall composition, where x=0.05-0.15, RE is rare earth element from the Y, Dy, Ho, Er, Tm, Yb and Lu group, onto a substrate moving through the deposition zone and heated to a temperature of at least 800° C., whereas the deposition is performed using an ablated target made from multiphase sintered ceramics comprised of chemical elements that compose the superconductor material, at a depo- (Continued)

sition rate greater than 100 nm/s and at a temperature gradient in the deposition zone that ensures the deposition of the superconductor material without the formation of liquid phase. The invention allows for improvement of the properties of flexible high temperature superconductor by increasing its critical current in high magnetic fields and ensures simple and economic large scale production of said HTS conductor with improved properties.

9 Claims, 4 Drawing Sheets

(56) References Cited

U.S. PATENT DOCUMENTS

2008/0176749 A1 7/2008 Goyal
2010/0022397 A1* 1/2010 Wang ................ H10N 60/0632 428/332
2010/0144536 A1* 6/2010 Obradors Berenguer .................. H10N 60/0324 977/700
2012/0015814 A1 1/2012 Usoskin et al.
2012/0028808 A1* 2/2012 Kaneko .............. H10N 60/0828 174/125.1
2018/0012683 A1 1/2018 Huh
2018/0197659 A1* 7/2018 Hayashi ................... C01G 1/02
2020/0399754 A1* 12/2020 Novozhilov ...... C23C 16/45561
2021/0323834 A1* 10/2021 Hirata ................ H10N 60/0828

OTHER PUBLICATIONS

Rossi, L. & Tomassini, D. The prospect for accelerator superconducting magnets: HL-LHC and beyond. Rev. Acceler. Sci. Technol. 10, 157-187 (2019).

Rossi, L. et al. Sample and length-dependent variability of 77 and 4.2 K properties in nominally identical RE123 coated conductors. Supercond. Sci. Technol. 29, 054006 (2016).

Fujita, S. et al. Flux-pinning properties of BaHfO3-doped EuBCO-coated conductors fabricated by hot-wall PLD. IEEE Trans. Appl. Supercond. 29(5), 8001505 (2019).

Molodyk, A., Samoilenkov, S., Markelov, A. et al. Development and large volume pro-duction of extremely high current density YBa2Cu3O7 superconducting wires for fusion. Sci Rep 11, 2084 (2021).

* cited by examiner

FLEXIBLE HIGH-TEMPERATURE SUPERCONDUCTOR AND METHOD FOR ITS PRODUCTION

CROSS-REFERENCE TO RELATED APPLICATION

This application claims priority to Russian Patent Application RU 2021121616, filed Jul. 21, 2021, which is incorporated herein by reference in its entirety.

FIELD OF THE INVENTION

The invention relates to electrical engineering, in particular, to the manufacturing technology of flexible high-temperature superconductors (HTS) with high critical current density in external magnetic field and to the method of manufacturing of said superconductors (tapes). The invention is applicable to industrial manufacturing of HTS wires with very high values of critical current density in magnetic fields over 1 Tesla at temperatures below 50 Kelvin, in particular, to industrial manufacturing of HTS wires intended for application in compact fusion reactors.

BACKGROUND OF THE INVENTION

Second generation high-temperature superconductor (2G HTS) wires are multilayered tapes fabricated by sequential deposition of layers of oxides and metals onto the surface of a metal substrate tape. In the HTS layer, a sharp biaxial crystal texture is formed due to the crystallographic texturing of either the metal substrate tape itself or one of the oxide buffer layers deposited onto the tape. Thanks to that sharp biaxial texture, the HTS layer, when it is in the superconducting state, can carry electric current at a high density that is it has a high value of critical current density. Depending on the fabrication method and the quality of the superconductor layer in the wire, the critical current density can reach from 1 to 7 $MA/cm^2$ at a temperature of 77 K, in the absence of an external magnetic field. The current-carrying capacity of the HTS wire is increased with decreasing temperature and it is decreased with increasing external magnetic field.

HTS wires are considered the most promising materials for creating high magnetic fields. As of today, the record DC magnetic field achieved with an HTS magnet is 45.5 T [Hahn, S. et al. 45.5-tesla direct-current magnetic field generated with a high-temperature superconducting magnet. Nature 570, 496-499 (2019)].

For the application of HTS wires in the magnetic systems of compact fusion reactors, the wires must have the engineering current density (through the entire wire cross-section, not just through the HTS layer) of at least 700 $A/mm^2$ at a temperature of 20 K and in a magnetic field of 20 T [Molodyk, A., Samoilenkov, S., Markelov, A. et al. Development and large volume production of extremely high current density $YBa_2Cu_3O_7$ superconducting wires for fusion. Sci Rep 11, 2084 (2021)]. That corresponds to the critical current of at least 392 A/cm-width for a wire of a thickness of 56 microns on a substrate of a thickness of 40 microns, with the HTS layer of a thickness of 2.5-3 microns, with the overall thickness of the protective silver layer of 3 microns, and the overall thickness of the stabilizing copper layer of 10 microns. For the application of HTS wires in the next generation accelerator magnets, the wires must have the engineering current density (through the entire wire cross-section, not just through the HTS layer) of at least 1000 $A/mm^2$ at a temperature of 4.2 K in a magnetic field of 20 T [Rossi, L. & Tomassini, D. The prospect for accelerator superconducting magnets: HL-LHC and beyond. Rev. Acceler. Sci. Technol. 10, 157-187 (2019)]. That corresponds to the critical current of at least 860 A/cm-width for a wire of a thickness of 86 microns on a substrate of a thickness of 40 microns, with the HTS layer of a thickness of 2.5-3 microns, with the overall thickness of the protective silver layer of 3 microns, and the overall thickness of the stabilizing copper layer of 40 microns.

Magnetic field generated by the electric current transmitted through the HTS wire, or by the external sources of magnetic field (for example, by external magnets) reduces the critical current density in the wire, thus it reduces the current-carrying capacity of the wire. Therefore, to generate high magnetic fields, coils made with HTS wires are cooled to low temperature, down to liquid helium temperature (4.2 K and below). Operating HTS coils at a higher temperature results in lower attainable magnetic fields: to 20-30 T at 20 K and to 10-15 T at 30-40 K.

To operate a magnet at a higher temperature is desirable because it simplifies the magnet design and manufacturing and reduces the magnet cost, while to generate a higher magnetic field is desirable because it improves the magnet performance important for the magnet user. The magnet performance can be improved by increasing the critical current density in the HTS wire.

The critical current density in HTS materials depends on the defect structure of the superconductor. It has been shown theoretically and demonstrated experimentally that, in order to maintain a high critical current density in high magnetic fields, in the HTS layer there must be defects a few nanometers in size because it is that size scale that is close to the size of magnetic field vortices that penetrate into the high-temperature superconductor. The nanometer-size scale defects act as the energetically most favorable sites for the location of the magnetic field vortices. At the same time, the presence of the defects must not induce strong mechanical strain in the crystal structure of the superconductor because the strain reduces the critical current density in the superconductor. The above-described mechanism to increase the critical current density in the superconductor by the intentional incorporation of structural defects is called "pinning", and the corresponding defects are often called "artificial pinning centers". Such structural defects can be inclusions of non-superconducting phases or defects of the crystal structure such as dislocations, point defects, antiphase boundaries and others.

The defects can be, for example, nanoparticles uniformly distributed in the superconductor matrix (US2012015814 (A1)), or nano-columns (US2018012683 (A1)).

In some embodiments the HTS layer contains both nanoparticles and nano-columns (U.S. Pat. No. 8,034,745).

An embodiment described in U.S. Pat. No. 8,034,745 (GOYAL AMIT [US]) discloses a flexible polycrystalline high-temperature superconductor tape based on REBCO, with the {100}<100> orientation, comprised of at least one superconductor layer that contains ordered dispersed epitaxial crystal nanoparticles and/or nano-columns of a non-superconducting material, which are preferentially oriented along the c axis of the superconductor, and the diameter of the nanoparticles and/or nano-columns is in the 2-100 nm range.

The composition of the REBCO superconductor film corresponds to the $RE_{0.8-2.0}Ba_{1.5-2.5}Cu_{2.5-3.5}O_x$ composition, with RE from the Y, Pr, Nd, Gd, Sm, Er, Eu, Pm, Dy, Ho, Tb, Tm or Lu group or a mixture thereof.

The non-superconducting material in the superconductor layer has the $BaMO_3$ chemical composition, with M from the Ti, Zr, Al, Hf, Ir, Sn, Nb, Mo, Ta, Ce, V group.

It is preferable that the crystallographic mismatch between the non-superconducting material in the superconductor layer and the superconductor layer is greater than 3% and, preferably, greater than or equal to 8%, and also that at least part of the non-superconducting material in the superconductor layer can be oriented randomly or non-epitaxially with respect to the superconductor layer.

The method of fabricating of a long flexible high-temperature superconducting tape is comprised of the following stages: (A) provision of a flexible polycrystalline biaxially textured substrate with a surface suitable for the epitaxial growth of superconductor, (B) heating of the substrate to a pre-set temperature suitable for the epitaxial growth of superconductor, (C) in-situ epitaxial deposition of a composite superconductor film from a mixture of starting materials in a pre-set atmosphere, onto the biaxially textured substrate, for example, by pulsed laser deposition (PLD), resulting in a film containing epitaxially grown crystalline nanoparticles and/or nano-columns of a non-superconducting material preferentially oriented along the c-axis of the superconductor, with the diameter of the nanoparticles and/or nano-columns in the 2-100 nm range.

A specific embodiment of the invention according to U.S. Pat. No. 8,034,745 was demonstrated for a high-temperature superconductor film of the $YBa_2Cu_3O_x$ (YBCO) composition. $BaZrO_3$ (BZO) nanoparticles and nano-columns were introduced into the superconductor layer during pulsed laser deposition of the superconductor layer and the non-superconducting particles from the same target containing a mixture of YBCO and a BZO nano-powder. The target was obtained by a mechanical mixing of a previously prepared YBCO with a micron-scale particle size with a commercial BZO nano-powder, followed by cold-pressing and sintering. YBCO was deposited onto biaxially textured substrates obtained by rolling (RABiTS) of a Ni-5 at. % W composition (50 microns thick, with pre-deposited buffer layers ($Y_2O_3$ (75 nm)/YSZ (75 nm)/$CeO_2$ (75 nm)), using a XeCl (308 nm) excimer laser LPX 305 at a 10 Hz repetition rate, at a 790° C. substrate deposition temperature and a 120 mTorr partial oxygen pressure.

The authors of the invention believe that the crystallographic mismatch between YBCO and BZO gives rise to the self-assembly of the incorporated non-superconducting particles, so that the deformation is minimized through the self-assembly of the particles, for example, into nano-columns, thus resulting in the increase of the critical current of the flexible superconductors in an external magnetic field.

There exist the following deficiencies of the known method. The incorporation of the BZO nanoparticles/nano-columns into the matrix of the YBCO superconductor layer induces a significant mechanical strain in the obtained composite film because of the significant crystallographic mismatch between the superconductor matrix and the non-superconducting particles, of greater than 8%. The strain in the superconductor layer results in a strong decrease of its superconducting properties at a relatively high temperature (77 K).

The incorporation of additional phases into the superconductor layer makes very complicated the chemical composition of the superconductor layer. In addition to that, the self-assembly processes are poorly reproducible and are very sensitive to insignificant changes of processing conditions, which are difficult to control [Rossi, L. et al. Sample and length-dependent variability of 77 and 4.2 K properties in nominally identical RE123 coated conductors. Supercond. Sci. Technol. 29, 054006 (2016)]. As result, the industrial manufacturing of flexible superconductors becomes more complicated; the window of processing conditions suitable for the manufacturing of high quality product gets narrower; in particular, lower deposition rates have to be used, in order to achieve the maximum improvement of the superconducting properties in an external magnetic field [Fujita, S. et al. Flux-pinning properties of $BaHfO_3$-doped EuBCO-coated conductors fabricated by hot-wall PLD. IEEE Trans. Appl. Supercond. 29(5), 8001505 (2019)].

The WO2020117369 A (METAL OXIDE TECHNOLOGIES, LLC) international patent application discloses a thin-film composite article comprised of a substrate, a buffer layer and a high-temperature superconductor layer, which additionally contains a non-superconducting material distributed preferentially along the superconductor a-b plane. The superconductor layer matrix is of the $REBa_2Cu_3O_7$ composition, where RE is one or more rare earth elements, for example, Y, La, Nd, Sm, Eu, Gd, Tb, Dy, Ho, Er, Tm, Yb and Lu. The non-superconducting material is represented by $RE_2O_3$ particles, where RE is one or more of the following elements: Y, La, Nd, Sm, Eu, Gd, Tb, Dy, Ho, Er, Tm, Yb and Lu.

The method to fabricate the high-temperature superconductor is comprised of provision of a substrate, deposition of a buffer layer onto the substrate, deposition of a high-temperature superconductor layer onto the buffer layer combined with the simultaneous deposition of a non-superconducting material distributed preferentially along the a-b plane coplanar with the superconductor layer, with the non-superconducting material being randomly distributed in the a-b plane and having no vertically oriented component. The simultaneous deposition can be performed with various methods, for example, with metal-organic chemical vapor deposition (MOCVD) or photoassisted MOCVD.

The invention according to the application allows the development of a superconducting article and the method of its manufacturing that do not require doping with an extrinsic material, nor do they require a specially oriented growth of nanoparticles for the manufacturing of HTS wire with high critical current even in high magnetic fields.

However, that method, which is the closest to the method proposed in our invention, does not provide for a sufficient throughput for the industrial manufacturing of flexible superconductors because of the low deposition rate of the superconductor layer due to the gas-phase deposition method used in that invention. In addition to that, the values of the critical current for a 1 cm wide tape in high magnetic fields: 450 A/cm-width at 4 K and 20 T given in WO2020117369 A patent application cannot be considered high, nor do they meet the above mentioned prospective application requirements, in particular, for the use of HTS wire in accelerators and fusion reactors.

Summarizing the deficiencies of the known methods, it can be concluded that those methods create certain technical difficulties for the manufacturing of flexible high-temperature superconductors.

SUMMARY OF THE INVENTION

Objective of our invention is to improve the superconductor performance by increasing its critical current in high magnetic fields, as well as to ensure simple industrial implementation of the developed method for a reproducible large-scale manufacturing of HTS wires with improved properties.

The objective is achieved by flexible high-temperature superconductor comprised of a substrate and a superconductor layer with the $RE_{1+2x}Ba_2Cu_3O_{7+3x}$ overall composition, including the superconductor matrix of the $REBa_2Cu_3O_7$ composition and non-superconducting nanoparticles of the $RE_2O_3$ composition, where x=0.05-0.15 and RE is a rare earth element from the Y, Dy, Ho, Er, Tm, Yb and Lu group, and whereas the concentration density of the said nanoparticles is at least $10^{16}$ nanoparticles/$cm^3$.

In some embodiments of the invention, the objective is achieved by superconductor wherein the thickness of the superconductor layer is from 1.5 to 3.5 microns.

The concentration density of non-superconducting particles in the claimed superconductor can be $10^{16}$-$10^{18}$ nanoparticles/$cm^3$.

In some embodiments of the invention, $RE_2O_3$ nanoparticles have a relatively isotropic shape and their size is no larger than 10 nm, and they are uniformly distributed within the entire volume of the superconductor matrix.

In the superconductor, said non-superconducting nanoparticles can have $(110)RE_2O_3$ axial texture with the following epitaxial relations with the superconductor matrix: $[001](110)RE_2O_3//[010](001)REBa_2Cu_3O_7$.

In other embodiments of the invention, the size of $RE_2O_3$ nanoparticles in the plane parallel to the (001) $REBa_2Cu_3O_7$ crystallographic plane is no larger than 30 nm, and in the direction parallel to the (001) $REBa_2Cu_3O_7$ crystallographic plane is no larger than 5 nm.

In yet other embodiments of the invention, non-superconducting $RE_2O_3$ nanoparticles with the size larger than 10 nm in the plane parallel to the (001) $REBa_2Cu_3O_7$ crystallographic plane are distributed in the superconductor matrix in layers parallel to the said crystallographic plane.

In this case the distance between the layers of non-superconducting $RE_2O_3$ nanoparticles can be from 20 to 100 nm.

Non-superconducting nanoparticles can have (001) $RE_2O_3$ axial texture with the following epitaxial relations with the superconductor matrix: $[100](001)\ RE_2O_3//[110](001)\ REBa_2Cu_3O_7$.

It is most preferred that the RE element in the superconductor is yttrium.

The superconductor is a tape comprised of a substrate, at least one buffer layer and a superconductor layer, and for the superconductor are typical the following lift-factor values, at the orientation of external magnetic field for which the minimum value of critical current is observed: 2.55±0.27 at 4.2 K and 1.13±0.17 at 20 K, at a 20 T magnetic field strength.

The superconductor is a tape comprised of a substrate, at least one buffer layer and a superconductor layer, and for the superconductor are typical the following absolute critical current values: at least 400 A/cm at 20 K and at least 875 A/cm at 4.2 K, at a 20 T magnetic field strength.

The objective is achieved by manufacturing flexible high-temperature superconductor by a method comprising pulsed laser deposition of superconductor material with the $RE_{1+2x}Ba_2Cu_3O_{7+3x}$ overall composition, where x=0.05-0.15, RE is a rare earth element from the Y, Dy, Ho, Er, Tm, Yb and Lu group, onto a substrate moving through the deposition zone and heated to a temperature of at least 800° C., whereas the deposition is performed using an ablated target made of a multiphase sintered ceramics of the elements that compose the superconductor material, whereas the deposition is performed at a deposition rate of greater than 100 nm/second and with a temperature gradient in the deposition zone that ensures the deposition of the superconductor material without the formation of liquid phase.

In some embodiments of the invention, pulsed laser deposition is performed at a repetition rate of up to 300 Hz and a pulse energy of from 500 to 1000 mJ.

In some embodiments of the invention, pulsed laser deposition is performed at a temperature gradient of from 50 to 300° C./cm.

BRIEF DESCRIPTION OF THE DRAWING FIGURES

FIG. 1 shows schematically the process of pulsed laser deposition of a coating with $Re_{1+2x}Ba_2Cu_3O_{7+3x}$ composition, the numerals mean:

1. Substrate
2. Focused laser beam
3. Plasma plume
4. Ceramic target
5. Heater block
6. Shields;

DETAILED DESCRIPTION OF THE PREFERRED EMBODIMENTS

Figure 1:
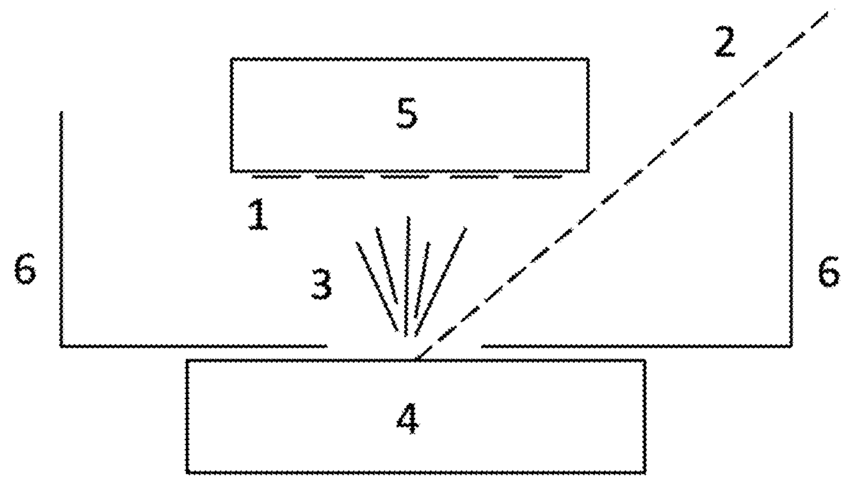

The essence of the invention is as follows.

Claimed flexible high-temperature superconductor is the second-generation flexible high-temperature superconductor. Such superconductors are comprised of a metal substrate and a superconductor layer. Typically, between the substrate and the superconductor layer, there are located buffer layers, which, as was mentioned above, translate the biaxial texture to the superconductor layer. The biaxial texture can be formed either in the metal substrate or in one of the buffer layers.

The overall composition of the superconductor layer in present invention is $RE_{1+2x}Ba_2Cu_3O_{7+3x}$, where x=0.05-0.15, and the structure of the superconductor layer is comprised of the superconductor matrix of $REBa_2Cu_3O_7$ composition and non-superconducting $RE_2O_3$ nanoparticles. According to the invention, RE is a rare earth element from the Y, Dy, Ho, Er, Tm, Yb and Lu group. The choice of the RE elements is based on the values of their effective ionic radii r($R^{3+}$, CN 8) of from 0.0870 to 0.1027 nm, where r is the effective ionic radius, $R^{3+}$ is the oxidation state of +3, CN 8 is the coordination number of 8. In other words, these elements have reasonably small ionic radii and, in contrast to such rare earth element as, for example, Gd, Eu and Sm cannot substitute barium in the superconductor structure, forming the $RE_{1+x}Ba_{2-x}Cu_3O_7$ solid solution.

Because of that, $REBa_2Cu_3O_7$ with the selected RE are "point" compounds on the phase diagram, that is they have very narrow cation homogeneity regions, and thus, when the conditions allow diffusion, excessive RE atoms cannot incorporate into the REBCO structure.

In this case, in the superconductor layer with $RE_{1+x}Ba_{2-x}Cu_3O_{7+3x}$ overall composition, rare earth oxide is crystallized and thus it ensures the required structure of the superconductor matrix with non-superconducting $RE_2O_3$ nano-inclusions having the claimed density of such particles.

The low crystallographic lattice mismatch between $RE_2O_3$ and $REBa_2Cu_3O_7$ (for example, for RE=Y the lattice mismatch is <3%) prevents significant mechanical strain in the superconductor layer and, therefore, is beneficial for the superconducting properties of the claimed superconductor and constitutes an essential difference of our method from the methods where the HTS layer contains nano-columns and where the superconductor crystallographic c-parameter increases with increasing content of the columnar nano-inclusions (see U.S. Pat. No. 8,034,745).

The concentration density of non-superconducting $RE_2O_3$ nanoparticles is at least $10^{16}$ nanoparticles/$cm^3$. Such a high nanoparticle concentration density is an extremely important feature that enables high values of critical current density, because $RE_2O_3$ nanoparticles and associated structural defects surrounding them such as dislocations, point defects, antiphase boundaries and others, act a pinning centers that hold the magnetic field vortices. The upper boundary of the claimed nanoparticle concentration density is limited by thermodynamic and kinetic factors, in particular, by the diffusion mobility of the components of the growing film. We have obtained good results for the nanoparticle density of $10^{18}$ nanoparticles/$cm^3$.

In the art, a nanoparticle is an isolated solid phase object that has a well-defined boundary with surrounding medium, and the size of that object in each of the three dimensions is from 1 to 100 nm.

In the present invention, $RE_2O_3$ non-superconducting particles meet this definition, including the size range. In the best embodiments, $RE_2O_3$ nanoparticle size in the plane parallel to the (001) $REBa_2Cu_3O_7$ crystallographic plane is no greater than 30 nm, and in the direction perpendicular to the (001) $REBa_2Cu_3O_7$ crystallographic plane is no greater than 5 nm. The shape of the non-superconducting particles can be isotropic and non-isotropic, that is the particles can be of an approximately cubic shape or they can also be elongated in the plane parallel to the (001) $REBa_2Cu_3O_7$ crystallographic plane.

$RE_2O_3$ nanoparticles can be uniformly distributed in the $REBa_2Cu_3O_7$ matrix, or, in addition to that, they can assemble in the matrix into layers parallel to the (001) $REBa_2Cu_3O_7$ crystallographic plane. The first arrangement (uniform distribution) is more typical when the nanoparticle size, at the claimed concentration density, is no greater than 10 nm in the plane parallel to the (001) $REBa_2Cu_3O_7$ crystallographic plane, whereas the second arrangement (in layers) is more typical when the nanoparticle size, at the claimed concentration density, is greater than 10 nm in the plane parallel to the (001) $REBa_2Cu_3O_7$ crystallographic plane. In the first arrangement (uniform distribution) the non-superconducting nanoparticles have (110) $RE_2O_3$ axial texture, and in the second arrangement (in layers) the non-superconducting nanoparticles have (001) $RE_2O_3$ axial texture. It should be noted that the superconductor in which $RE_2O_3$ nanoparticles are assembled in layers in the $REBa_2Cu_3O_7$ matrix has no clear advantages in the performance in magnetic field comparing to the superconductor without such assembly.

Above we presented our analysis of the requirements to rare earth elements suitable for this method and of the particular group of elements that meet the requirements. Yttrium stands out among the elements in this group. It has the lowest atomic weight and hence the highest diffusion coefficient in the group. This results in a faster formation of non-superconducting nanoparticles. In addition, the yttrium price is reasonable because of its good natural availability, and there are other advantages to yttrium such as the very low neutron cross-section, which is an added advantage to the use of yttrium-based HTS wires in fusion reactors.

Essential for our invention is also the thickness of the superconductor layer. Naturally, with a thicker superconductor layer and a thinner substrate, enhanced performance of the second-generation HTS wire can be attained, in particular, a higher engineering current density; however, it is difficult to manufacture such superconductors economically and with a high production yield.

We industrially manufacture, using pulsed laser deposition, flexible superconductors with the thickness of the superconductor layer of at least 1.5 microns and even up to 3.5 microns, on the average of 2.4±0.3 microns.

The method to manufacture claimed flexible superconductor includes pulsed laser deposition of the superconductor material with $RE_{1+2x}Ba_2Cu_3O_{7+3x}$ overall composition onto a moving substrate heated to a temperature of at least 800° C. The deposition is performed using an ablated target made of a multiphase sintered ceramics of the elements that compose the superconductor material. The deposition rate is greater than 100 nm/second and a temperature gradient in the deposition zone between the substrate and other equipment parts is such that it will ensure the deposition of the superconductor material without the formation of liquid phase.

The substrate temperature is set at a relatively high value (at least 800° C.) so that it will promote high diffusion mobility of the components of the film being grown on the substrate. The maximum temperature is limited by the thermodynamic stability of $REBa_2Cu_3O_7$.

The film growth is performed at a temperature gradient that differentiates our method from known methods (hot wall PLD) in which the tape is kept at temperature equilibrium (is surrounded by hot environment). Our requirement to the temperature gradient is such that no liquid phase is formed when the superconductor material is deposited. This ensures that the deposition conditions (oxygen partial pressure and temperature) at the substrate surface are within the superconductor ($REBa_2Cu_3O_{7-y}$) thermodynamic stability range, while the diffusion rate of the deposited material species favors the formation of non-superconducting particle inclusions. The presence of liquid phase would result in large crystallites thus impeding or preventing the formation of the required micro- and nano-structure in the superconductor layer.

The film is grown in a pulsed mode at a very high local deposition rate (over 100 nm/s). The maximum of the deposition rate range is limited by the diffusion mobility of the film growth medium; however, at the state of the art, the achievable maximum deposition rate is limited by the technical specifications of pulsed laser deposition equipment. The high film growth rate is possible due to the absence of diffusion-limiting factors such as, for example, counter-diffusion of oxidized components of metal-organic compounds from the film growth region or high $CO_2$ concentration that are typical for chemical vapor deposition (WO2020117369 A). Indeed, in MOCVD the film growth rate is constant and insignificant, being 5-20 nm/s, which is many times lower than in our method.

For HTS layer deposition, only the HTS components are used: RE, barium and copper. The composition and concentration of defects, the dominant defects being $RE_2O_3$ nanoparticles, are mainly controlled by the composition of the PLD target.

The PLD target is a sintered multi-phase ceramics containing the $RE_2BaCuO_5$, CuO and $REBa_2Cu_3O_{7-y}$ phases. The cation ratio is determined by the following: the amount of RE oxide inclusions is a function of the [RE]/[Ba] ratio in the target, and the amount of copper in the target is selected so that the resulting film will not contain copper oxide inclusions, according to the data of x-ray diffraction and electron microscopy.

All of the above ensures the fabrication of high temperature superconductor with unique high superconducting performance in magnetic field.

Pulsed laser deposition can be performed under various conditions, depending on the equipment used. In particular, in our embodiments under industrial manufacturing conditions, it is appropriate to perform pulsed laser deposition at a pulse repetition rate of up to 300 Hz and a pulse energy of 500-1000 mJ. Not only do such parameters ensure the claimed technical result, but also they allow for the most productive industrial operation. All of the above does not mean that it is impossible to perform pulsed laser deposition at other pulse repetition rates and/or other pulse energy values.

As stated above, one of the technical requirements is to create a temperature gradient in the deposition zone, so that no liquid phase will form during the superconductor material deposition.

The required gradient is created by heating the substrate onto which the superconductor layer is being deposited. The deposition chamber walls are either heated insignificantly due to the heat transfer from the substrate or remain cold. The calculation of the temperature gradient that prevents the formation of liquid phase is performed using the pulsed laser deposition equipment parameters (see below). In our equipment, pulsed laser deposition is performed at a temperature gradient of 50-300° C./cm.

EXAMPLES OF THE EMBODIMENTS OF INVENTION

The following embodiment example makes it easier to understand the pulsed laser deposition process.

Superconductor was fabricated on a strong substrate tape made of Hastelloy C276. The substrate thickness was 40 microns and the substrate width was 12 mm After the deposition of the HTS layer and the protective silver layer the tape was slit from 12 mm width to three strips of 4 mm width each; after that, a protective copper layer of the overall thickness of 10 microns (5 microns per side) was electroplated onto the strips. Prior to the HTS layer deposition, buffer layer architecture based on IBAD-MgO with the $LaMnO_3$ top layer was deposited onto the substrate. The HTS layer was grown by pulsed laser deposition.

According to the schematic in FIG. 1, metal substrate 1 with biaxially textured oxide buffer layers was heated to the substrate temperature of 800-850° C. by the massive heater block 5 that had a temperature of 1000-1100° C., and the tape was moved through the deposition zone where the deposition of the HTS layer took place.

HTS layer deposition was performed by the condensation of the constituent elements, yttrium, barium, copper and oxygen, from plasma plume 3 formed during ablation of ceramic target 4 with focused laser beam 2 of an excimer laser with a wavelength of 308 nm. Coherent LEAP 130C (200 Hz) and LEAP 300C (300 Hz) excimer lasers were used. Pulse energy was in the 500-1000 mJ range.

To ensure the formation of the $Y_2O_3$ phase in the YBCO matrix, ceramic targets were used that were enriched with yttrium oxide comparing to the $YBa_2Cu_3O_7$ stoichiometric composition. The target composition was chosen so that the superconductor layer of $RE_{1+2x}Ba_2Cu_3O_{7+3x}$ overall composition, where x=0.05 and x=0.15 would be obtained.

The deposition zone was confined by substrate 1, target 4 and shields 6 that protect the equipment from the material ablated from the target. In this regard, "temperature gradient in the deposition zone" means the temperature gradient between substrate 1 and target 4, and between substrate 1 and shields 6.

The substrate tape was moved helically through the deposition zone in several parallel lanes (4-6), in order to increase the utilization of the ablated material onto the tape and obtain a HTS film of a sufficient thickness; however, this is not a required condition for fabricating the superconductor layer.

Uniform multiphase sintered ceramic target 4 was cooled at the side opposite to the side irradiated with excimer laser beam 2, to a temperature in the 20-200° C. range. The temperature of shields 6 was in the 200-400° C. range. The distance from the shields to the metal tape was from 4 to 8 cm. Thus, average temperature gradient was from (800–400)/8=50° C./cm to (1100–200)/4=225° C./cm. The target ablation takes place under the continuous scanning of the focused laser beam over the target surface, to ensure the uniform distribution of the material in the deposition zone. The local deposition rate onto the substrate was at least 100 nm/s.

Pulsed laser deposition was performed to reach the predetermined thickness of the superconductor layer. To achieve that, we adjusted the required number of tape passes through the deposition zone and the tape motion speed.

Table 1 lists the composition of superconductor layers and processing conditions used to fabricate the layers, as well as corresponding values of critical current at 77 K in self-field and at 4.2 and 20 K in 20 T magnetic field, and the values of lift-factors at 4.2 and 20 K in 20 T magnetic field.

Figure 2:
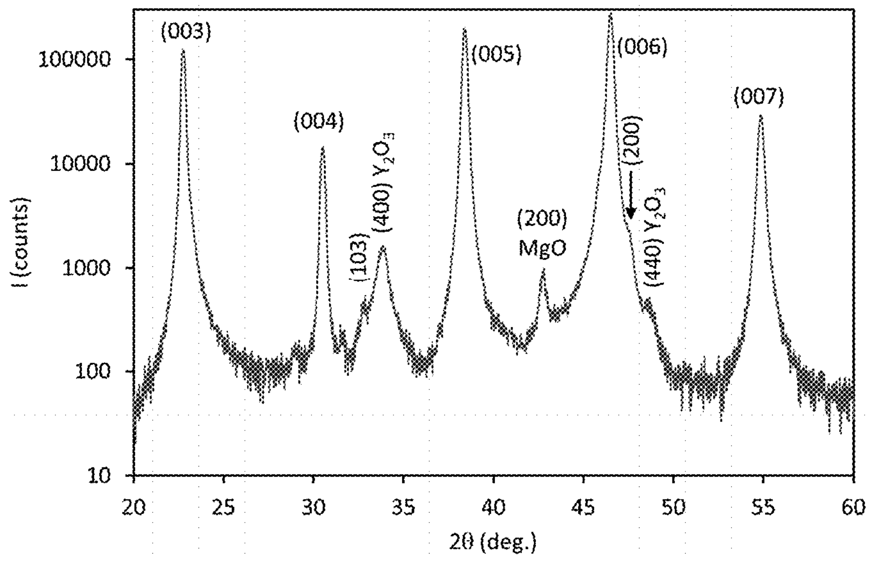
FIG. 2 shows the data of X-ray diffraction θ-2θ-scan of a YBCO sample with x=0.15 that contains $Y_2O_3$ nanoparticles.

FIG. 2 shows the x-ray diffraction θ-2θ-scanning data for a YBCO superconductor sample containing $Y_2O_3$ nanoparticles. The YBCO phase peaks are indexed with numbers without captions. The $Y_2O_3$ phase and the MgO buffer layer phase peaks are indexed with captions. In addition to the (00L)-type peaks of the YBCO phase, which indicate the presence of (001) YBCO axial orientation, and the MgO buffer layer peak, the x-ray patterns contain broad, low-intensity (400) and (440) $Y_2O_3$ peaks indicating the presence of $Y_2O_3$ nanoparticles with two types of axial orientation: (001) and (110).

The following two orientations were established by the fast Fourier transform analysis of the transmission electron microscopy (TEM) images: [100](001)$Y_2O_3$//[110](001) YBCO and (110)$Y_2O_3$//[010](001)YBCO; this agrees with the x-ray diffraction results.

Figure 3:
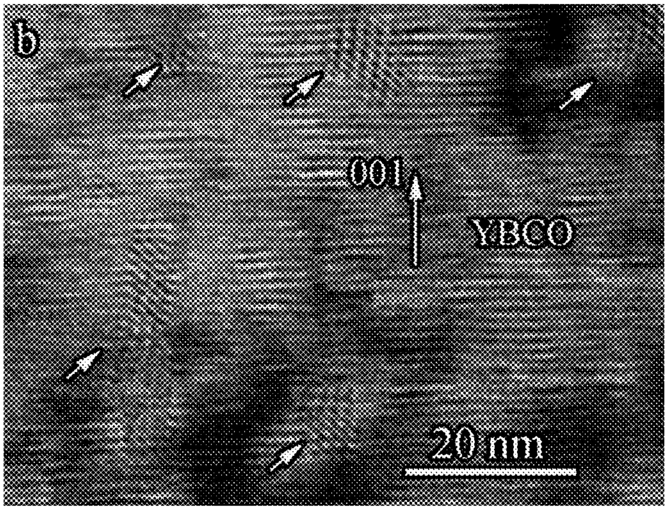
FIG. 3 shows a transmission electron microscopy (TEM) cross-sectional image of a $Y_{1+2x}Ba_2Cu_3O_{7+3x}$ layer with x=0.15 that contains (110)-oriented $Y_2O_3$ nanoparticles.

FIG. 3 shows a TEM image of semi-coherent (110)-oriented $Y_2O_3$ nanoparticles (marked with arrows) in the YBCO matrix. Particles of this type are uniformly distributed in the YBCO matrix and are observed in TEM images as the moiré features, which points to their relatively isotropic shape and a very small size of no more than 10 nm.

Figure 4:
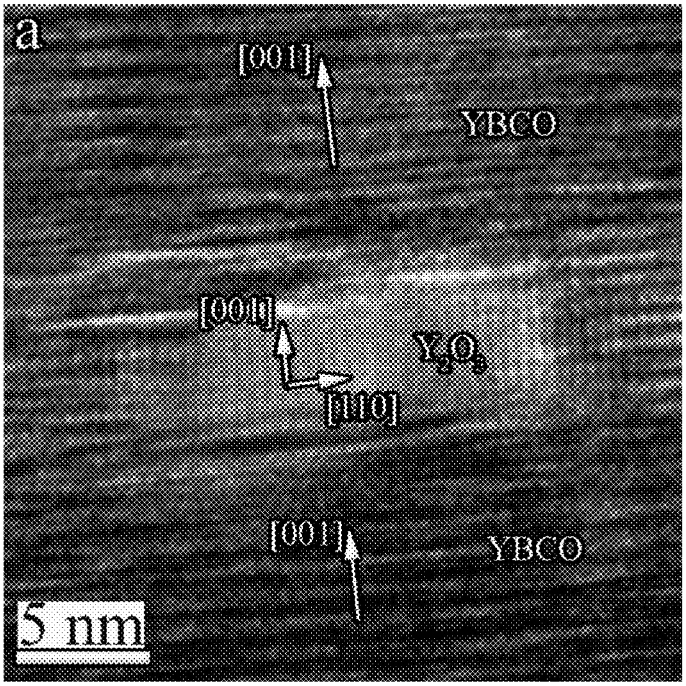
FIG. 4 shows a transmission electron microscopy (TEM) cross-sectional image of a $Y_{1+2x}Ba_2Cu_3O_{7+3x}$ layer with x=0.15 that contains (001)-oriented $Y_2O_3$ nanoparticles.

(001)-oriented $Y_2O_3$ nanoparticles are usually of anisotropic shape but are elongated along the (001)YBCO plane. FIG. 4 shows a TEM image of a semicoherent (001)$Y_2O_3$ nanoparticle elongated in the (001)YBCO plane. The nanoparticle size is about 15 nm in the (001)YBCO plane and about 5 nm in the direction perpendicular to the (001)YBCO plane.

Figure 5:
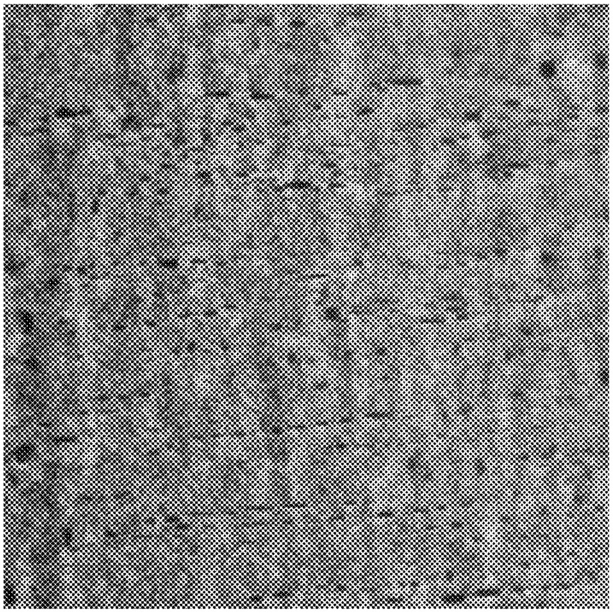
FIG. 5 shows a transmission electron microscopy (TEM) cross-sectional image of a $Y_{1+2x}Ba_2Cu_3O_{7+3x}$ layer with x=0.15 that contains (001)-oriented $Y_2O_3$ nanoparticles assembled into layers parallel to the (001)YBCO plane.

In some cases, at a lower magnification (FIG. 5) we can observe that some (001)-oriented $Y_2O_3$ nanoparticles assemble into rows approximately parallel to the (001) YBCO plane.

Average concentration density of the nanoparticles throughout the entire film thickness is $2.5*10^{17}$ nanoparticles/$cm^3$.

We tested the claimed technology in pilot production of flexible HTS. Pulsed laser deposition of the superconductor layer was performed according to the present invention. We fabricated over 600 km of HTS conductor based on YBCO using this technology; this allowed us to perform a comprehensive statistical study of the fabricated flexible HTS.

Figure 6:
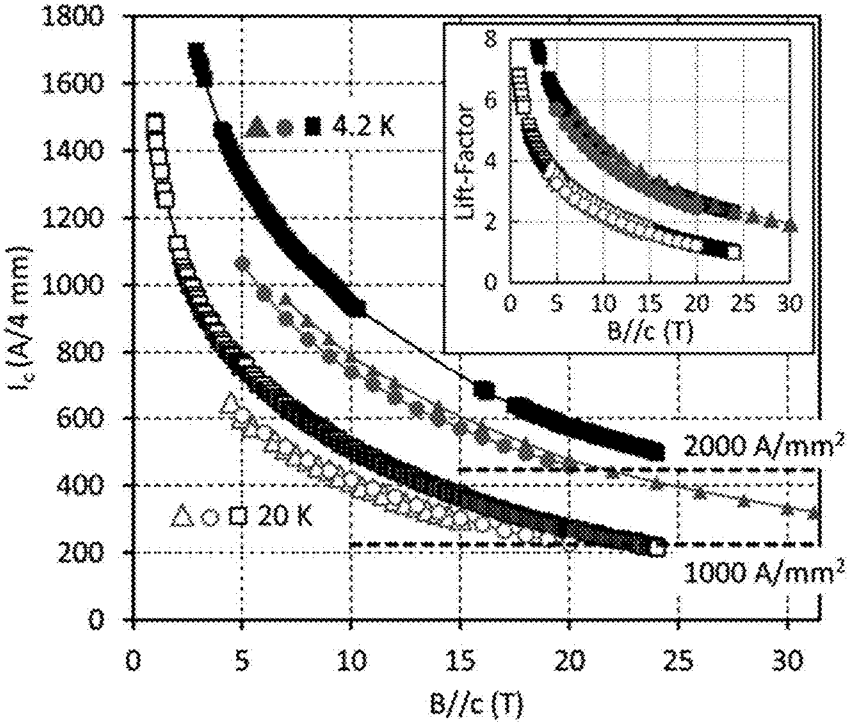
FIG. 6 shows dependences of critical current on magnetic field for three different samples of YBCO wire containing $Y_2O_3$ nanoparticles measured at 4.2 and 20 K. The inset shows the dependences of lift-factors on magnetic field at 4.2 and 20 K for the same three samples.

FIG. 6 shows the critical current, L, at low temperature in magnetic field oriented parallel to the conductor surface (B//c) for three YBCO wire samples measured at University of Geneva (red curves), Tohoku University (black curves) and the NHMFL at Florida State University (blue curves). In all three samples very high values of critical current were achieved. In particular, an $I_c$ at 20 K, 20 T in the 220-270 A/4 mm range (550-675 A/cm width) and an $I_c$ at 4.2 K, 20 T in the 450-570 A/4 mm range (1125-1425 A/cm width) were measured. Record values of engineering current density, $J_E$, for commercial wires of over 1000 A/$mm^2$ at 20 K, 20 T and over 2000 A/$mm^2$ at 4.2 K, 20 T were established for 40-micron substrate with 5 microns per side of stabilizing copper. These results far outperform the requirements to application of HTS conductors in the magnet systems of compact fusion reactors and in the next generation accelerator magnets. Despite a certain variation in the $I_c$ values in the three samples, there is a low statistical scatter in the ratio of the 77 K and 4.2 and 20 K data (the so-called lift-factor), for these samples (FIG. 6, inset), as well as for the entire production lot (Table 2). This verifies the good reproducibility of our HTS fabrication technology and the predictability of superconducting properties.

Figure 7:
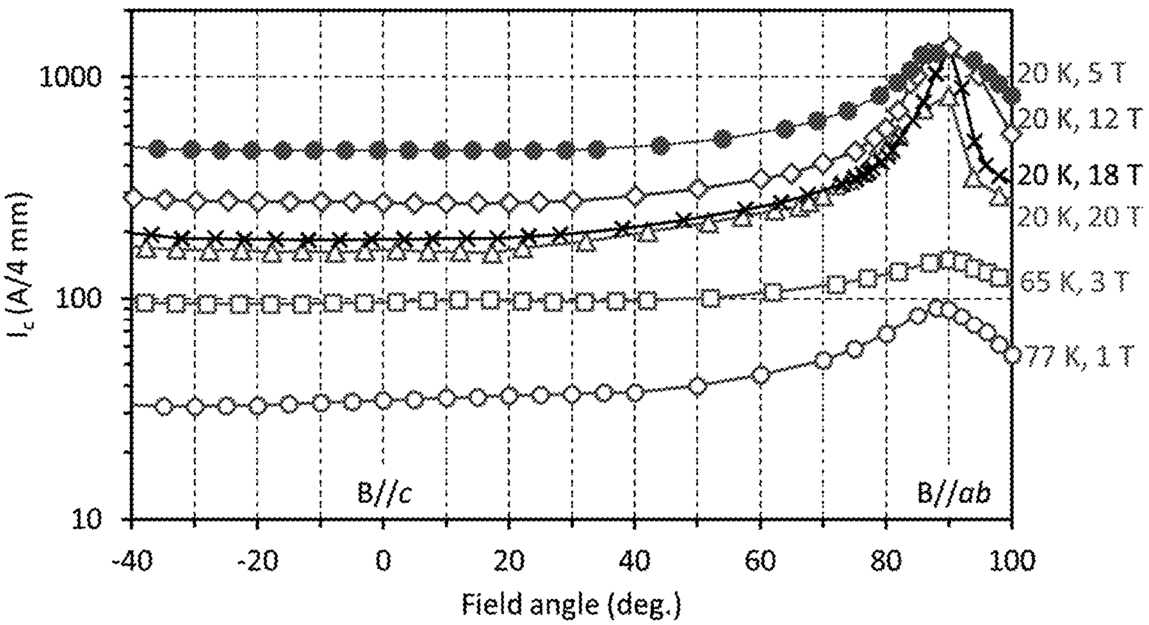
FIG. 7 shows angular dependences of critical current in magnetic field for a sample of YBCO wire containing $Y_2O_3$ nanoparticles at 77 K, 1 T; 65 K, 3 T and at 20 K in 5, 12, 18 and 20 T magnetic fields.

Due to the structural anisotropy of YBCO, $I_c$ depends on the magnetic field direction. FIG. 7 shows angular dependences of $I_c$ in magnetic field of YBCO conductor with $Y_2O_3$ nanoparticles at 77 K, 1 T; 65 K, 3 T and 20 K, 5, 12, 18, and 20 T. Measurements were performed at Tohoku University. 0° corresponds to the B//c orientation and 90° corresponds to the B//ab orientation. The maximum of $I_c$ occurs with field applied parallel to the wire surface (90°, B//ab). Importantly, there is no $I_c$ peak at the 0° (B//c) orientation, as is typical for REBCO films with c-axis correlated nano-columnar artificial pinning centers. In a wide angular region about the B//c orientation, the $I_c$ dependence is flat, with the $I_c$ variation below 3%. Therefore, for YBCO wire the minimum $I_c$ for all field orientations, an important parameter for practical use, is at B//c.

Table 2 shows magnetic field dependences (B//c) of average lift-factor values for 4.2 and 20 K, for a set of 200 samples from industrially fabricated conductor based on YBCO with $Y_2O_3$ nanoparticles.

Figure 8:
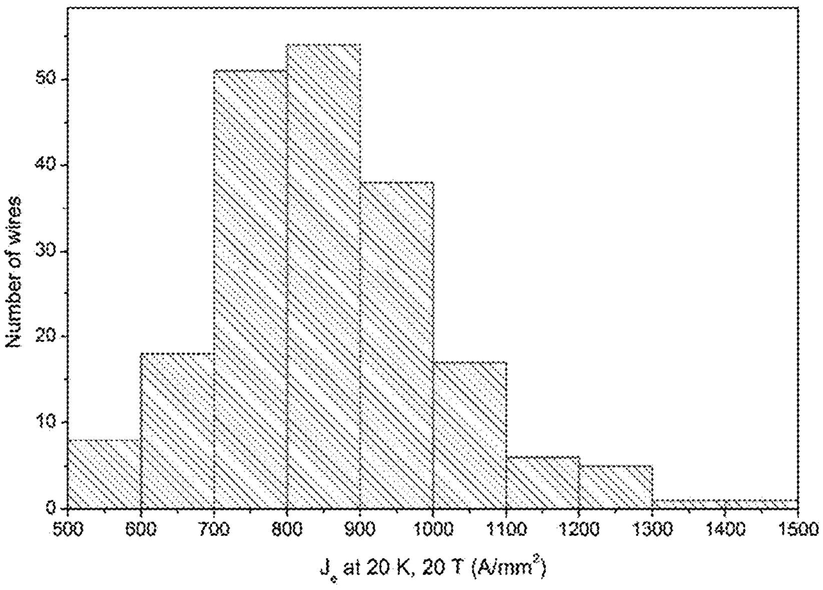
FIG. 8 shows a distribution histogram of engineering current density at 20 K, 20 T for samples selected from 200 industrially manufactured YBCO wires containing $Y_2O_3$ nanoparticles.

FIG. 8 shows a $J_E$ at 20 K, 20 T distribution histogram for a set of 200 samples from industrially fabricated conductor based on YBCO with $Y_2O_3$ nanoparticles (overall conductor thickness of 56 microns on a substrate of 40-micron thickness, with a HTS layer thickness of 2.4±0.3 micron, overall protective silver layer thickness of 3 microns, and overall stabilizing copper layer thickness of 10 microns). $J_E$ is in the 500-1400 A/$mm^2$ range, 87% of the wires having a $J_E$ above 700 A/$mm^2$ and 72% having a $J_E$ of 700-1000 A/$mm^2$.

It is the embodiment of this invention in pilot production that made practically possible the creation in 5-10 years of compact fusion reactors with plasma confinement by magnetic fields over 10 T.

All measurements were performed according to the following procedures.

Positional non-contact measurements of critical current at 77 K in self-field were performed along the entire length of each wire with a TapeStar XL machine, with a longitudinal resolution of 2 mm. As-measured non-contact $I_c$ data for each wire were calibrated by the standard 4-contact transport DC measurements, using a 1 μV/cm criterion for $I_c$. The critical current at 77 K in self-field was 175 A (437 A/cm), averaged over the entire wire lot. The best 10% of wires had an $I_c$ of over 200 A (500 A/cm).

YBCO film thickness was determined gravimetrically by weighing three 30 cm long pieces of 12 mm wide wire before and after dissolving the HTS layer in 5% nitric acid, according to patent RU 2687312.

Transmission electron microscopy (TEM) images were taken in an Osiris TEM/STEM (Thermo Fisher Scientific, USA) equipped with a high angle annular dark field (HAADF) electron detector (Fischione, USA) and Bruker energy-dispersive X-ray microanalysis (ERA) system (Bruker, USA) at an accelerating voltage of 200 kV. Image processing was performed using Digital Micrograph (Gatan, USA) and TIA (ThermoFisher Scientific, USA) software.

The measurements of critical current in high magnetic field were performed in independent laboratories equipped with appropriate facilities: National High Magnetic Field Laboratory (NHMFL), Tallahassee, USA; University of Geneva, Switzerland, and Tohoku University, Japan.

High-field measurements at NHMFL were performed on full 4 mm width samples in two magnets. For in-field experiments up to 15 T, used the Oxford Instruments 15 T/17 T magnet system with a 52 mm cold bore was used. Samples were immersed in liquid helium during experiments at 4.2 K. Samples were in helium gas during experiments at 20 K. In experiments up to 31.2 T used the NHMFL resistive magnet system (cell 7) was used with a 50 mm bore magnet; 38 mm in Janis cryostat.

The experimental setup at the University of Geneva allows measuring $I_c$ up to 2 kA at 4.2 K in liquid He and up to 1 kA in He gas flow by standard four-probe measurement. A 19 T (at 4.2 K)/21 T (at 2.2 K) superconducting solenoid magnet from Bruker BioSpin completes the system. A temperature precision down to ±0.01 K is achieved in He gas flow up to 50 K using an active temperature stabilization system which compensates the heating during current runs with PID controlled heaters.

The $I_c$(B, T, θ) data collection in High Field Laboratory for Superconducting Materials at Tohoku University was carried out using 30 μm and 40 μm bridges of 1 mm length fabricated by picosecond laser micromachining from the 4 mm tapes with the top Ag layer. The measurements were performed at 77, 65, 40, 20 and 4.2 K using 20T-CSM and 25T-CSM cryogen-free superconducting magnets. The angular dependence $I_c(\theta)$ data were collected in the range from −45° to 120°.

We used the so-called "lift-factor" methodology in our result analysis. Lift-factor is a simple empirical $I_c$ scaling parameter: it is defined as the ratio of a sample's $I_c$ at a specific temperature and magnetic field to the $I_c$ of the same sample at 77 K in self-field.

The above data show that flexible superconductor according to the invention demonstrates extremely high values of critical current in high magnetic fields. Moreover, claimed technology proved excellent in pilot industrial manufacturing of flexible superconductors with robust and stable properties. We attribute the great stability of our commercial production to our choice of native $RE_2O_3$ nanoparticles as dominant pinning centers. They do not increase the chemical complexity of REBCO and they impart a simple, uniform nanostructure, amenable to reproducible fabrication.

Especially important is that we obtain these extraordinarily high values not in select champion samples but in hundreds of kilometers of routinely manufactured, commercially available flexible high temperature superconductor.

TABLE 1

| | Sample # | 1 | 2 |
|---|---|---|---|
| Superconductor | Overall composition of HTS layer $Y_{1+2x}Ba_2Cu_3O_{7+3x}$ | x = 0.05 | x = 0.15 |
| | HTS layer thickness (microns) | 2.3 | 2.4 |
| | Texture of $Y_2O_3$ nanoparticles | (001) and (110) | (001) and (110) |
| | Concentration density of $Y_2O_3$ nanoparticles (nanoparticles/cm$^3$) | 0.7*10$^{17}$-3.2*10$^{17}$ | 1.9*10$^{17}$-5.9*10$^{17}$ |
| | Size of $Y_2O_3$ nanoparticles (nm) | (110) $Y_2O_3$:~5 (001) $Y_2O_3$: (10-30)*5 | (110) $Y_2O_3$:~5 (001) $Y_2O_3$: (10-30)*5 |
| | Distribution of $Y_2O_3$ nanoparticles in the matrix | (110) $Y_2O_3$: uniform (001) $Y_2O_3$: partly uniform, partly assembled in layers parallel to the (001) YBCO plane | (110) $Y_2O_3$: uniform (001) $Y_2O_3$: partly uniform, partly assembled in layers parallel to the (001) YBCO plane |
| Superconductor fabrication parameters | Substrate temperature (° C.) | 800 | 850 |
| | Temperature gradient (° C./cm) | 75 | 200 |
| | Laser pulse repletion rate (Hz) | 200 | 300 |
| | Pulse energy (mJ) | 500 | 1000 |
| | Deposition rate (nm/s) | 100 | 300 |
| Properties | Critical current at 77K in self-field (A/cm width) | 430 | 440 |
| | Critical current at 20K, 20 T (A/cm width) | 495 | 585 |
| | Lift-factor at 20K, 20 T | 1.15 | 1.33 |
| | Critical current at 4.2K, 20 T (A/cm width) | 1054 | 1170 |
| | Lift-factor at 4.2K, 20 T | 2.45 | 2.66 |

TABLE 2

| B//c (T) | Average lift-factor value at 4.2K ± standard deviation | Average lift-factor value at 20K ± standard deviation |
|---|---|---|
| 0 | 17.50 ± 2.13 | 13.23 ± 1.72 |
| 1 | 11.69 ± 1.63 | 6.96 ± 1.19 |
| 2 | 8.79 ± 1.24 | 4.93 ± 0.86 |
| 3 | 7.32 ± 1.04 | 4.14 ± 0.76 |
| 4 | 6.52 ± 0.91 | 3.61 ± 0.66 |
| 5 | 5.76 ± 0.80 | 3.21 ± 0.59 |

TABLE 2-continued

| B//c (T) | Average lift-factor value at 4.2K ± standard deviation | Average lift-factor value at 20K ± standard deviation |
|---|---|---|
| 6 | 5.27 ± 0.73 | 2.92 ± 0.54 |
| 7 | 4.93 ± 0.67 | 2.67 ± 0.49 |
| 8 | 4.60 ± 0.60 | 2.45 ± 0.44 |
| 9 | 4.32 ± 0.56 | 2.21 ± 0.38 |
| 10 | 4.07 ± 0.51 | 2.05 ± 0.35 |
| 11 | 3.85 ± 0.48 | 1.92 ± 0.32 |
| 12 | 3.64 ± 0.45 | 1.79 ± 0.30 |
| 13 | 3.46 ± 0.43 | 1.68 ± 0.27 |
| 14 | 3.29 ± 0.39 | 1.57 ± 0.26 |
| 15 | 3.13 ± 0.36 | 1.48 ± 0.24 |
| 16 | 3.00 ± 0.34 | 1.40 ± 0.22 |
| 17 | 2.86 ± 0.31 | 1.32 ± 0.21 |
| 18 | 2.75 ± 0.31 | 1.25 ± 0.20 |
| 19 | 2.64 ± 0.28 | 1.19 ± 0.16 |
| 20 | 2.55 ± 0.27 | 1.13 ± 0.17 |

The invention claimed is:

1. A flexible high temperature superconductor comprising:

a substrate and a superconductor layer having an $RE_{1+2x}Ba_2Cu_3O_{7+3x}$ overall composition;

the superconductor layer comprising a superconductor matrix having an $REBa_2Cu_3O_7$ composition and non-superconducting nanoparticles of an $RE_2O_3$ composition;

the nanoparticles having a concentration density of at least $10^{16}$ nanoparticles/cm$^3$, a size of $RE_2O_3$ nanoparticles in a plane parallel to a (001) $REBa_2Cu_3O_7$ crystallographic plane 10-30 nm and no larger than 5 nm in a direction perpendicular to the (001) $REBa_2Cu_3O_7$ crystallographic plane;

wherein: x=0.05-0.15, RE is a rare earth element selected from the group consisting of Y, Dy, Ho, Er, Tm, Yb and Lu.

2. The superconductor of claim 1, wherein a thickness of the superconductor layer ranges from 1.5 to 3.5 microns.

3. The superconductor of claim 1, wherein the concentration density of the non-superconducting nanoparticles is from $10^{16}$ to $10^{18}$ nanoparticles/$cm^3$.

4. The superconductor of claim 1, wherein a distance between said layers of non-superconducting $RE_2O_3$ nanoparticles is from 20 to 100 nm.

5. The superconductor of claim 1, wherein non-superconducting nanoparticles have (001) $RE_2O_3$ axial texture with the following epitaxial relations with the superconductor matrix: [100](001) $RE_2O_3$//[110](001) $REBa_2Cu_3O_7$.

6. The superconductor of claim 1, wherein RE is yttrium.

7. The superconductor of claim 1 being a tape comprised of a substrate, at least one buffer layer and a superconductor layer, the superconductor being characterized by lift-factor values for such orientation of an external magnetic field that the orientation corresponds to a minimum value of critical current at a 20 T magnetic field strength, an average lift-factor value being 2.55±0.27 at 4.2 K and 1.13±0.17 at 20 K.

8. The superconductor of claim 1 being a tape comprised of a substrate, at least one buffer layer and a superconductor layer, and for the superconductor are the following absolute values of critical current: at least 400 A/cm at 20 K and at least 875 A/cm at 4.2 K at a magnetic field strength of 20 T.

9. The superconductor of claim 1, wherein non-superconducting $RE_2O_3$ nanoparticles with the size larger than 10 nm in the plane parallel to the (001) $REBa_1Cu_3O_7$ crystallographic plane are distributed in the superconductor matrix as layers assembled parallel to said crystallographic plane.

* * * * *